United States Patent [19]
Rabatin

[11] 4,316,092
[45] Feb. 16, 1982

[54] X-RAY IMAGE CONVERTERS UTILIZING RARE EARTH ADMIXTURES

[75] Inventor: Jacob G. Rabatin, Chardon, Ohio

[73] Assignee: General Electric Company, Schenectady, N.Y.

[21] Appl. No.: 180,845

[22] Filed: Aug. 25, 1980

Related U.S. Application Data

[63] Continuation-in-part of Ser. No. 6,681, Jan. 26, 1979, abandoned, which is a continuation-in-part of Ser. No. 864,389, Dec. 27, 1977, abandoned, which is a continuation of Ser. No. 749,881, Dec. 13, 1976, abandoned.

[51] Int. Cl.³ .............................................. G01J 1/58
[52] U.S. Cl. .................................... 250/483; 250/460; 250/475.1; 252/301.4 P; 252/301.4 H
[58] Field of Search ...................... 250/483, 460, 475

[56] References Cited
U.S. PATENT DOCUMENTS 3,795,814  3/1974  Rabatin ............................... 250/460
4,070,583  1/1978  Rabatin ............................... 250/486
4,130,428  12/1978 Van Doorselaer ................. 250/486

Primary Examiner—Harold A. Dixon
Attorney, Agent, or Firm—John F. McDevitt; Lawrence R. Kempton; Philip L. Schlamp

[57] ABSTRACT

Various rare earth phosphor admixtures are described utilizing thulium-activated oxyhalides of lanthanum and/or gadolinium to provide improved performance in x-ray image converter devices. These phosphor admixtures are used in radiographic screens in combination with either blue sensitive or green sensitive photographic film.

8 Claims, 2 Drawing Figures

X-RAY IMAGE CONVERTERS UTILIZING RARE EARTH ADMIXTURES

This is a continuation-in-part of application Ser. No. 6,681, filed Jan. 26, 1979, now abandoned, which is a continuation-in-part of application Ser. No. 864,389, filed Dec. 27, 1977, now abandoned, and which is a continuation of now abandoned application Ser. No. 749,881, filed Dec. 13, 1976.

BACKGROUND OF THE INVENTION

The present invention pertains to rare earth phosphor admixtures utilizing thulium-activated lanthanum or gadolinium oxyhalide phosphor material to increase the relative speed and resolution of an x-ray image compared with conventional phosphors as well as reduce the still serious crossover problem now experienced with conventional phosphors.

In recently issued U.S. Pat. No. 3,795,814, there is described and claimed lanthanum and gadolinium oxyhalide phosphors activated with thulium as efficient materials to convert x-radiation to visible light. Various image converter devices utilizing said luminescent materials are also described for conversion of the x-rays to blue emission. A particular x-ray intensifying screen is disclosed for use with photographic film which is sensitive to the "blue-near ultraviolet" radiation being emitted by said phosphors.

A more recently issued U.S. Pat. No. 4,070,583 discloses a different x-ray intensifying screen which can be subject to poor resolution and a blurred image produced from what is termed a "crossover" problem. Said x-ray screen construction utilizes a double emulsion photographic film with a pair of phosphor layers which are oriented so that light emitted from each phosphor layer can expose both emulsion layers. The crossover problem arises from light passage entirely through the next adjacent emulsion layer for exposure of the more remote emulsion layer. For the x-ray screen construction described therein, a blue-sensitive photographic film is employed together with a particular rare-earth oxyhalide phosphor material which is coactivated with terbium and thulium to reduce the crossover problem effects. The improvement is attributable primarily to a greater UV emission of said phosphor material since UV emission is absorbed to a higher degree than visible light by the silver halide particles in the next adjacent emulsion layer.

On the other hand, a more severe crossover problem is encountered when green sensitive photographic film is customarily employed with known $La_2O_2S:Tb$ and $Gd_2O_2S:Tb$ phosphor admixtures in this type x-ray screen construction. Such combination has been found to exhibit poorer resolution along with a blurred photographic image since the green emission from said phosphor admixtures is not absorbed by the next adjacent phosphor layer to the same degree as blue emission. Thus, while the known phosphor admixture is selected for light emission in a spectral region where the green sensitive photographic film is most responsive, such selection produces a more serious crossover problem.

The seriousness and extent of said crossover and image resolution or sharpness problems in x-ray screens utilizing a double emulsion type green sensitive photographic film is disclosed in U.S. Pat. No. 4,130,428 along with means said to lessen both undesirable effects. A green light emitting screen is therein described for use with a particular silver halide emulsion film along with screening and filtering dyes being mentioned that reduce the amount of light crossover from 59% to 44%. Said result is also therein compared with a 51% light crossover said to exist for blue light emitting calcium tungstate screens when used with a blue base commercial photographic film. The phosphor materials selected for use in said improved x-ray screens are various rare earth oxychloride and oxysulfide phosphors activated with various rare earth elements including terbium and thulium with a preferred phosphor being a mixture of yttrium oxysulfide activated with terbium or terbium and dysprosium that is mixed with gadolinium or lanthanum or lutetium oxysulfide activated with terbium or dysprosium.

Accordingly, it is an important object of the present invention to provide a rare earth phosphor admixture having better resolution capabilities than presently used phosphor materials for a particular x-ray screen construction employing green-sensitive photographic film.

It is another object of the present invention to provide further improved radiographic screens employing green-sensitive photographic film by means of having associated optical filtering media in said construction.

Still another important objective of the present invention is to provide a rare earth phosphor mixture having better image resolution capability and less crossover problem when used with blue-sensitive photographic film as well as green-sensitive photographic film.

SUMMARY OF THE INVENTION

An improved phosphor admixture is provided for use in x-ray screens of the multilayer type construction above described which achieves considerable reduction in light crossover as well as improved image resolution and which does so with photographic film particularly sensitive to light at wavelengths up to about 570 nanometers wavelength. That such improvement can be obtained with photographic film spectrally sensitized in either the blue color region or green color region is surprising upon considering the well accepted practice heretofore, of matching the emission color of the phosphor material selected to the spectral color sensitivity of the associated photographic film. Specifically, a photographic film particularly sensitive to light in the blue color region (320–450 nanometer wavelength range) was generally employed with phosphor materials exhibiting blue color emission while a photographic film sensitive to light in the green color region (450–570 nanometer wavelength range) was generally selected for use with phosphor materials exhibiting green color emission.

In accordance with the present invention, however, the phosphor admixture comprises a particular first phosphor which emits efficiently in the blue and green color spectral region in combination with a particular second phosphor which emits efficiently in the near ultraviolet-blue color spectral region to achieve comparable improvements with either blue color sensitive or green color sensitive photographic film. The first phosphor consists of polyhedral shaped terbium activated gadolinium oxysulfide crystals having an average particle size in the range of approximately 6 to about 20 microns diameter. A terbium activator level from about 0.1 to about 5.0 mole percent per mole of said first phosphor material is suitable for use in the phosphor admixture if the associated photographic film is particularly sensitive to light in the green color region whereas a lower terbium activator level from about 0.1 to about 0.5 mole percent is selected for use with a photographic film particularly sensitive to light in the blue color region. The second phosphor constituent in the present phosphor admixture consists of plate-like crystals of thulium activated rare earth oxyhalide phosphor having the general formula:

$$LnOX:Tm^{3+}$$

wherein
Ln is one or more of La and Gd,
X is one or more of Cl and Br, and
Tm is present as an activator ion from about 0.05 to about 1 mole percent,
and with said phosphor crystals having an average particle size in the range from approximately 2 to about 12 microns.

The improvement in resolution capability or image sharpness according to the present invention is attributable to the shape and size of the phosphor particles in the phosphor combination. As will be more fully explained in connection with the hereinafter described preferred embodiments, the specific phosphor admixture herein employed produces a shorter effective light path through the individual phosphor layers than now occurs with the phosphor materials in present use. For example, a conventional blue color emitting phosphor layer of LaOBr:Tm now being used with blue color sensitive photographic film produces significant light scattering with resultant image blurring due to the plate-like phosphor crystals being aligned parallel to the major film axis. The relatively high refractive index (about 2.0) of said phosphor material contributes to light scattering in the film direction whereby less light reaches the film from remotely located phosphor particles for increased quantum noise or mottle. An even more severe quantum noise problem exists for the conventional terbium activated lanthanum and gadolinium oxysulfide phosphor admixtures now being employed with green color sensitive photographic film despite a lower refractive index (about 1.7) and polyhedral crystalline shape of the phosphor particles.

The plate-like LaOX:Tm phosphor particles in the present phosphor admixture are more randomly oriented in the phosphor layers due to physical presence of the generally larger size and polyhedral shaped particles of $Gd_2O_2S:Tb$ phosphor. A larger fraction of said plate-like phosphor particles are thereby aligned in a direction towards the film axis which "pipes" the light in this direction for a shorter light path. Additionally, the lower refractive index of the adjoining polyhedral $Gd_2O_2S:Tb$ phosphor particles facilitates light passage through said material to further reduce the light path distance to the photographic film. A more effective use is made of the individual phosphor materials in this manner so that less light is scattered from phosphor particles more remotely located from the photographic film. In so doing, it can be noted that the optical and physical properties, including size and shape of the phosphor particles, in the present phosphor admixture contribute in achieving the desired improvement.

The further improvement derived in a considerable reduction of the crossover problem with the present phosphor admixture is also attributable to cooperation between the particular phosphor components being employed. As has been above indicated, the conventional green color emitting phosphor materials now being employed with green color sensitive photographic film suffer considerable light crossover. Utilization of the present phosphor admixture with green color sensitive photographic can reduce light crossover by as much as 50% or even greater due to the negligible contribution of green color emission by the LaOX:Tm phosphor component in said admixture. Surprisingly, the general equivalency in film speed for the present phosphor admixture as compared with LaOBr:Tm when used with blue color sensitive photographic film also produces considerably less light crossover than has been above indicated for conventional blue color systems. That film speeds comparable to or greater than film speeds obtained with conventional phosphor materials now used with both blue color sensitive and green color sensitive photographic film are also possible with the present phosphor admixture represents still another unexpected advantage upon considering the greater difficulty normally experienced in matching the spectral color sensitivity of a photographic film when phosphors having different color emission are involved.

An especially preferred rare earth phosphor admixture of the present invention utilizes approximately 20-80 parts by weight of the above defined terbium activated gadolinium oxysulfide phosphor with approximately 20-80 parts by weight of the above defined thulium activated rare earth oxyhalide phosphor. An approximately equal parts by weight of said constituents in the phosphor admixture is preferred for use with a photographic film which is particularly sensitive to light in the green color region. Fur use with photographic film which is particularly sensitive to light in the blue color region, it is preferred that the associated phosphor admixture contain less parts by weight of the terbium activated phosphor constituent than parts by weight of the other phosphor constituent.

An important factor in the improvements found, as above indicated, resides in the relatively finer particle size of the LaOBr:Tm phosphor constituent. Said phosphor constituent comprises well-formed plate-like crystals having a size and uniformity to avoid optical scattering which produces a blurred image when the phosphor particles are below a certain size or if the phosphor particles are irregular in shape. The most suitable phosphor size range from a 8 mil thick radiographic screen is not less than about 2 microns in particle size and not more than about 12 microns particle size.

In the particular x-ray screen construction of the present invention, the foregoing phosphor admixtures are employed in the pair of phosphor layers which are positioned on each side of a double emulsion photographic film to form a multi-layer sandwich configuration. The preferred embodiment of said multi-layer x-ray screen construction further includes utilization of a UV absorption dye in the otherwise transparent support layer of the photographic film member to cooperate with the present phosphor material in reducing the amount of emitted radiation which can cross over to the more remote emulsion layer. Crossover causes widening of images and blurring due to lack of alignment or registry between the image as formed on the next adjacent emulsion layer when exposed and the crossover image formed on said more remotely disposed emulsion layer. A better understanding of said crossover problem and the improvement provided in accordance with the present invention can be gained from the following detailed description when considered with the accompanying drawings.

DESCRIPTION OF THE PREFERRED EMBODIMENTS

Figure 1:
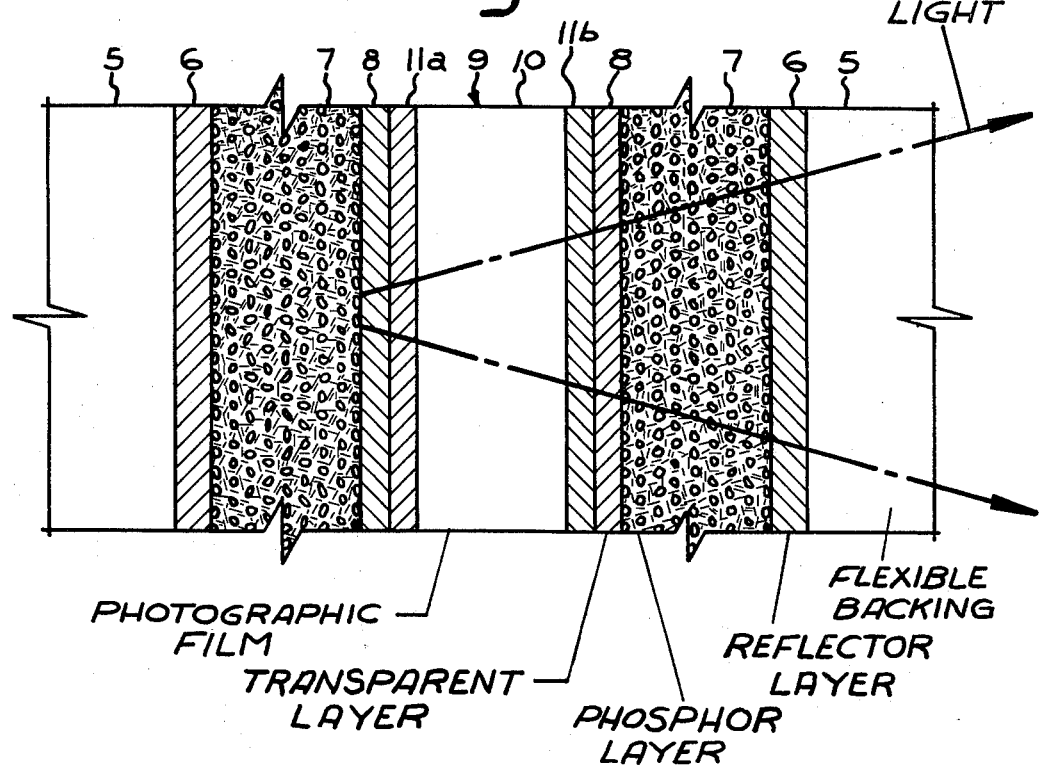
FIG. 1 is a cross section of an improved multi-layer x-ray screen construction which incorporates the present phosphor materials along with a dye system to absorb ultraviolet light which ordinarily crosses over from the silver halide emulsion layer being exposed to the other emulsion layer.

Referring to FIG. 1, a multi-layer x-ray screen construction is depicted in cross section having a double emulsion photographic film 9 which has an optically transparent polyester base 10 incorporating a dye system to absorb the ultraviolet and light emission which ordinarily crosses over from one of the silver halide emulsion layers to the other, 11a to 11b, and vice versa. As previously indicated, such emission crossover will cause the widening of images and blurring due to the lack of alignment or registry between the image as formed on the particular emulsion layer being exposed and the more remote emulsion layer receiving the crossover image. This is illustrated by the crossover rays passing from emulsion layer 11a to 11b in the depicted embodiment. As will be appreciated, there is an enlarged image on the emulsion layer 11b which will be read as a blurring effect after the film is developed. Said crossover problem is minimized in accordance with the present invention for green photographic film embodiments by reducing the amount of green emission from the phosphor admixture since the thulium-activated lanthanum and/or gadolinium oxyhalide constituent thereof emits primarily in the UV and blue region of the spectrum. Accordingly, the crossover problem is ameliorated in said green film embodiments with the sacrifice of some green emission although the efficient blue emission of said thulium-activated phosphor constituent provides exposure of the next adjacent green sensitive emulsion layer with greater linear speed than is obtained with the terbium-activated rare earth phosphor constituent in the present phosphor admixture. A suitable UV dye demonstrating the desired coaction with the present phosphor admixture can be Cyasorb (2-hydroxy-4-methoxybenzophenone) which is available from American Cyanamid Company but it is expected that 1,3,5-trizaine could also be substituted.

As further shown in said accompanying drawing, the preferred x-ray screen construction further includes flexible backing 5 which supports a pair of reflecting layers 6 positioned adjacent the exteriormost major surfaces of the pair of phosphor layers 7. In said preferred construction, the location of said reflecting layers could aggravate the crossover problem since crossover rays passing from one emulsion layer and through the transparent support layer 10 of the double emulsion photographic film 9 could also be reflected back to the emulsion layer being exposed for additional image blurring. Further transparent layers 8 are utilized in the preferred x-ray screen embodiment to resist mechanical abrasion of the photographic film and/or phosphor layers during physical movement therebetween when an exposed film is removed for development and a new film inserted for additional use of said assembly.

Various radiographic screens having the above construction were prepared by dispersing one or more of the phosphor materials reported in Table I on the following page in a suitable resin binder and then casting the screens on a supporting member according to conventional techniques well known in the art. The speed of said screens was measured at 80 KVp with 1 inch aluminum filtration while resolution measurements were carried out at 50 KVp with ⅛ inch aluminum filtration. The reported measurements provide comparison between the present phosphor admixtures and a commercial admixture having 40% by weight $La_2O_2S:Tb$ with 60% by weight $Gd_2O_2S:Tb$. Performance of the individual constituents in the commercial admixture are also reported.

TABLE I

| Screen Composition | Screen(mils) Thickness | Relative Speed | Res. LP/mm. | Quantum Mottle |
|---|---|---|---|---|
| 40% $La_2O_2S:Tb$, 60% $Gd_2O_2S:Tb$ | 14 mil | 8.0 | 5.6 | most |
| LaOBr .003Tm | 10 mil | 8.1 | 7.0 | least |
| $La_2O_2S:Tb$ | 8 mil | 4.3 | 5.8 | least |
| 50% $La_2O_2S:Tb$, 50% LaOBr .003Tm | 8 mil | 6.1 | 7.0 | least |
| 40% $La_2O_2S:Tb$, 60% $Gd_2O_2S:Tb$ | 14 mil | 8.0 | 5.6 | most |
| 50% LaOBr .003Tm, 50% $Gd_2O_2S:Tb$ | 8 mil | 7.0 | 7.0 | medium |
| 50% LaOBr .003Tm, 50% $Gd_2O_2S:Tb$ | 12 mil | 8.4 | — | medium |
| 50% LaOBr .003Tm, 50% $Gd_2O_2S:Tb$ | 16 mil | 8.9 | — | medium |
| $Gd_2O_2S:Tb$ | 8 mil | 6.8 | 5.6 | most |
| $Gd_2O_2S:Tb$ | 12 mil | 7.8 | — | most |

As can be noted from the preceding measurements, the present phosphor admixtures demonstrate both greater speed and resolution capability than is obtained with commercial screens or the individual phosphor constituents employed therein. The preferred admixtures of the present invention thereby provide greater linear speed response over the entire medical diagnostic KVp range than is provided with the conventional green film systems.

Comparable film speed and quantum mottle measurements were made with the same above type radiographic screen construction and using some of the same phosphor materials but substituting a photographic film particularly sensitive to light in the blue color region. The test measurements were conducted with Kodak X-Omat R blue sensitive film at exposures of 80 KVp intensity and the results are reported in Table II below for a phosphor layer or screen thickness of approximately 5.9 mils thickness.

TABLE II

| Screen Composition | Relative Speed | Resolution (LP/mm) | Quantum Mottle |
|---|---|---|---|
| LaOBr:Tm | 6.0 | 7.0 | medium |
| 50% LaOBr:Tm 50% $Gd_2O_2S:Tb$ | 5.0 | 7.0 | least |
| $Gd_2O_2S:Tb$ | 2.5 | 5.6 | most |

It can be noted from said Table II measurements that the present phosphor admixtures provide both greater speed and resolution than $Gd_2O_2S$ and is comparable to LaOBr:Tm when blue sensitive photographic film is employed. As also previously pointed out, the reduction in quantum mottle experienced with the present phosphor admixture, and which is indicative of reduced light crossover attributable to the beneficial light "piping" effect being obtained represents an improvement over both conventional phosphors illustrated.

Figure 2:
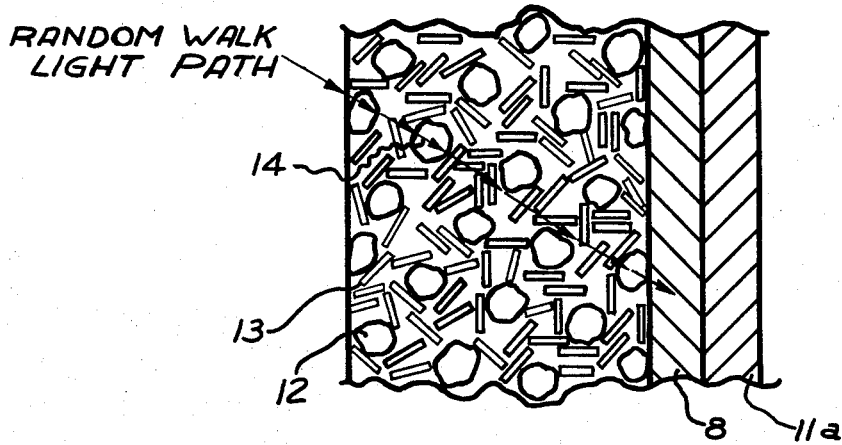
FIG. 2 is a more detailed cross-sectional view depicting the light path through an individual phosphor layer produced in accordance with the present invention.

In FIG. 2, there is shown a more detailed illustration of an individual phosphor layer 7 produced in accordance with the present invention along with an associated photographic emulsion layer 11a and a transparent layer 8, all as depicted in the FIG. 1 screen construction. Accordingly, the polyhedral shaped $Gd_2O_2S$ phosphor particles 12 are uniformly distributed in said phosphor layer 11a to obstruct a parallel alignment of the plate-like LaOBr:Tm phosphor particles 13 also dispersed in said phosphor admixture. It can be noted that a substantial portion of said LaOBr:Tm phosphor particles are thereby oriented with the major crystalline axis being aligned toward said photographic emulsion layer 11a rather than being aligned parallel to said member. As a result, the light path 14 through said phosphor layer proceeds as shown with a shorter path length than would be provided by a parallel alignment of the LaOBr:Tm phosphor particles.

It will be apparent from the foregoing description that novel x-ray screen device has been disclosed which exhibits particular advantages when employed with both blue sensitive and green sensitive photographic film. It should also be appreciated from the foregoing description that luminescent materials of the present invention can be prepared having slightly modified compositions than above specifically disclosed without sacrificing the disclosed performance advantages. For example, a minor substitution of fluoride ion for chloride or bromide ion in the thulium-activated oxyhalide phosphor constituent should not materially lower these advantages. It is intended to limit the present invention, therefore, only by the scope of the following claims.

What I claim as new and desire to secure by Letters Patent of the United States is:

1. An improved multi-layer x-ray screen construction which comprises:
   (a) a photographic film having emulsion layers disposed on each major surface and separated by an optically transparent support,
   (b) a pair of phosphor layers being positioned on each side of said photographic film to form a sandwich configuration, and
   (c) each of said phosphor layers comprising an admixture of polyhedral terbium activated gadolinium oxysulfide phosphor crystals having an average particle size in the range of approximately 6 to about 20 microns in combination with plate-like crystals having an average particle size in the range from approximately 2 to about 12 microns having the general formula:

$$LnOX:Tm^{3+}$$

wherein
   Ln is one or more of La and Gd,
   X is one or more of Cl and Br, and
   Tm is present as an activator ion from about 0.05 to about 1 mole percent,
said phosphor admixture exhibiting improved resolution capability and reduced crossover problem.

2. An improved x-ray screen as in claim 1 wherein said phosphor admixture contains approximately 20–80 parts by weight of said terbium activated gadolinium oxysulfide phosphor with approximately 20–80 parts by weight of said other phosphor.

3. An improved x-ray screen as in claim 1 wherein said photographic film is particularly sensitive to light in the blue color region and said phosphor admixture contains less parts by weight of said terbium activated gadolinium oxysulfide phosphor than parts by weight of said other phosphor.

4. An improved x-ray screen as in claim 1 wherein said photographic film is particularly sensitive to light in the green color region and said phosphor admixture contains about equal parts by weight of both phosphors.

5. An improved x-ray screen as in claim 1 wherein said photographic film further includes an ultraviolet absorbing dye for cooperation in reducing the crossover through said support.

6. An improved x-ray screen as in claim 1 which further includes light reflecting layers positioned adjacent the exteriormost major surfaces of the phosphor layers.

7. An improved x-ray screen as in claim 1 wherein said photographic film is particularly sensitive to light in the green color region and the terbium activator level in the terbium activated gadolinium oxysulfide phosphor is from about 0.1 to about 15.0 mole percent.

8. An improved x-ray screen as in claim 1 wherein said photographic film is particularly sensitive to light in the blue color region and the terbium activator level in the gadolinium oxysulfide phosphor is from about 0.1 to about 0.5 mole percent.

* * * * *